US010173866B2

(12) United States Patent
Deimer

(10) Patent No.: US 10,173,866 B2
(45) Date of Patent: Jan. 8, 2019

(54) CRANE CONTROLLER

(71) Applicant: Palfinger AG, Salzburg (AT)

(72) Inventor: Thomas Deimer, Moosdorf (AT)

(73) Assignee: PALFINGER AG, Salzburg (AT)

( * ) Notice: Subject to any disclaimer, the term of this patent is extended or adjusted under 35 U.S.C. 154(b) by 0 days.

(21) Appl. No.: 15/223,191

(22) Filed: Jul. 29, 2016

(65) Prior Publication Data

US 2017/0029252 A1   Feb. 2, 2017

Related U.S. Application Data

(63) Continuation of application No. PCT/AT2015/000013, filed on Jan. 29, 2015.

(30) Foreign Application Priority Data

Jan. 31, 2014   (AT) .............. GM44/2014 U

(51) Int. Cl.
*B66C 13/44* (2006.01)
*B66C 13/48* (2006.01)
(Continued)

(52) U.S. Cl.
CPC ............. *B66C 13/44* (2013.01); *B60P 1/54* (2013.01); *B66C 13/48* (2013.01); *B66C 13/56* (2013.01);
(Continued)

(58) Field of Classification Search
CPC ......... B66C 13/00; B66C 13/44; B66C 13/48; B66C 13/56; B66C 23/00; B66C 23/42;
(Continued)

(56) References Cited

U.S. PATENT DOCUMENTS

| | | |
|---|---|---|
| 4,037,742 A | 7/1977 | Gustafsson |
| 4,910,662 A | 3/1990 | Heiser et al. |

(Continued)

FOREIGN PATENT DOCUMENTS

| | | |
|---|---|---|
| CN | 201358142 | 12/2009 |
| CN | 202156793 | 3/2012 |

(Continued)

OTHER PUBLICATIONS

International Search Report dated May 19, 2015 in International (PCT) Application No. PCT/AT2015/000013.

(Continued)

*Primary Examiner* — Yonel Beaulieu

(74) *Attorney, Agent, or Firm* — Wenderoth, Lind & Ponack, L.L.P.

(57) ABSTRACT

A crane controller for a crane, in particular a cargo crane, has a first operating mode, in which the crane can be user-operated by control commands from an operator, and a second operating mode that can be activated by the operator. In the second operating mode, the crane geometry can be changed by the crane controller in a pre-defined sequence of movements. The crane controller has a menu-drive user interface, and the interface has a function which can be selected by the operator and by which the crane controller switches from the first to the second operating mode.

29 Claims, 20 Drawing Sheets

(51) Int. Cl.
    *B66C 13/56* (2006.01)
    *B66C 23/42* (2006.01)
    *B60P 1/54* (2006.01)
    *B66C 23/00* (2006.01)
    *B66C 23/58* (2006.01)

(52) U.S. Cl.
    CPC .............. *B66C 23/42* (2013.01); *B66C 23/54* (2013.01); *B66C 23/585* (2013.01)

(58) Field of Classification Search
    CPC ......... B66C 23/54; B66C 23/585; B60P 1/00; B60P 1/54
    See application file for complete search history.

(56) References Cited

U.S. PATENT DOCUMENTS

| | | | |
|---|---|---|---|
| 4,964,779 | A | 10/1990 | Sagaser |
| 5,270,621 | A | 12/1993 | Kiiski |
| 5,731,974 | A | 3/1998 | Pietzsch et al. |
| 5,731,987 | A | 3/1998 | Strong et al. |
| 5,854,988 | A | 12/1998 | Davidson et al. |
| 7,844,379 | B2 | 11/2010 | Tang et al. |
| 9,257,317 | B2 * | 2/2016 | Lee .................... H01L 21/6735 |
| 9,505,591 | B2 * | 11/2016 | Morath .................. B66C 13/16 |
| 9,637,355 | B2 * | 5/2017 | Henkel .................. B66C 13/18 |
| 2004/0073358 | A1 | 4/2004 | Wichner |
| 2005/0150854 | A1 | 7/2005 | Toudou et al. |
| 2007/0156280 | A1 | 7/2007 | Morath |
| 2012/0101694 | A1 | 4/2012 | Morath et al. |
| 2013/0345857 | A1 | 12/2013 | Lee et al. |
| 2015/0104276 | A1 * | 4/2015 | Lee .................. H01L 21/67733 414/222.01 |

FOREIGN PATENT DOCUMENTS

| | | |
|---|---|---|
| CN | 102718147 | 10/2012 |
| CN | 103010963 | 4/2013 |
| CN | 103231990 | 8/2013 |
| CN | 103575248 | 2/2014 |
| CN | 103754768 | 4/2014 |
| CN | 203806985 | 9/2014 |
| DE | 4404797 | 8/1995 |
| DE | 694 05 252 | 2/1998 |
| DE | 20 2010 014 309 | 3/2012 |
| EP | 0 035 809 | 9/1981 |
| EP | 2 298 689 | 3/2011 |
| EP | 2 388 228 | 11/2011 |
| GB | 2 353 513 | 2/2001 |
| GB | 2 353 515 | 2/2001 |
| JP | 5-201691 | 8/1993 |

OTHER PUBLICATIONS

Austrian Search Report dated Nov. 14, 2014 in Austrian Application No. GM 44/2014.
Alan Dix et al., "Human-Computer Interaction", Third Edition, published 2004.
Ben Shneiderman, "Designing the User Interface—Strategies for Effective Human-Computer Interaction", printed May 1987.
Philip Barker, "Basic Principles of Human-Computer Interface Design", Computer Studies Series, published 1989.
Tony Rubin, "User Interface Design for Computer Systems", published 1988.
Jakob Nielsen, "Usability Engineering", 1993.
Yvonne Rogers et al., "Interaction Design—Beyond Human-Computer Interaction", Third Edition, published 2011.
Konrad Baumann et al., "User Interface Design for Electronic Appliances", published 2001.
NEN 1299:2011 is an European standard approved by the CEN, 2011.
Rotzler, INFORM publication No. 20/06, 2006.
Rotzler, INFORM publication No. 21/07, 2007.
Rotzler, INFORM publication No. 22/07, 2007.
"All MoDern conveniences", Cranes Today Magazine, Oct. 2007.
Video clip published on YouTube, "Bison Check", 2012 https://www.youtube.com/watch?v=tM3gqoZloWI, publish Feb. 2012.
Operator's Manual, HIAB 222 ATF-1, AHSVS Recovery Crane, Sep. 2007, version 1.0.
Online Colllins Dictionary, Definition of "Menu Driven" https://www.collinsdictionary.com/dictionary/english/menu-driven.
Online Collins Dictionary, Definition interface of "User Interface", https://www.collinsdictionary.com/dictionary/english/user-interface.
Invoice No. 216640 of Mar. 30, 2009.
Rotzler, "Operating Instructions Bergfahrzeug—EMPL GEBAF", Aug. 2011, version 1.0.
Rotzler, "Extract delivery list to operating instructions Bergfahrzeug—EMPL GEBAF", Jun. 2017.

* cited by examiner

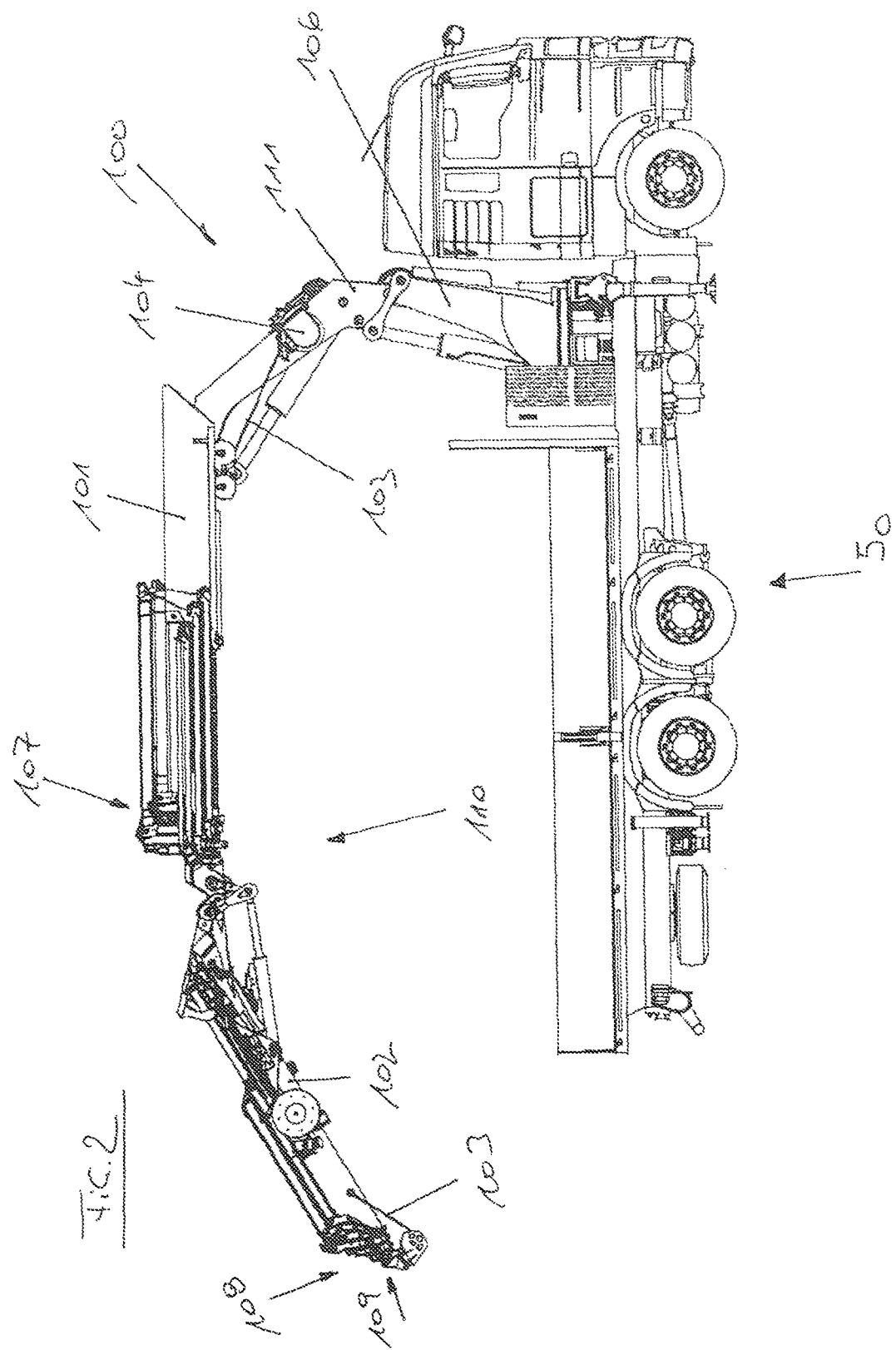

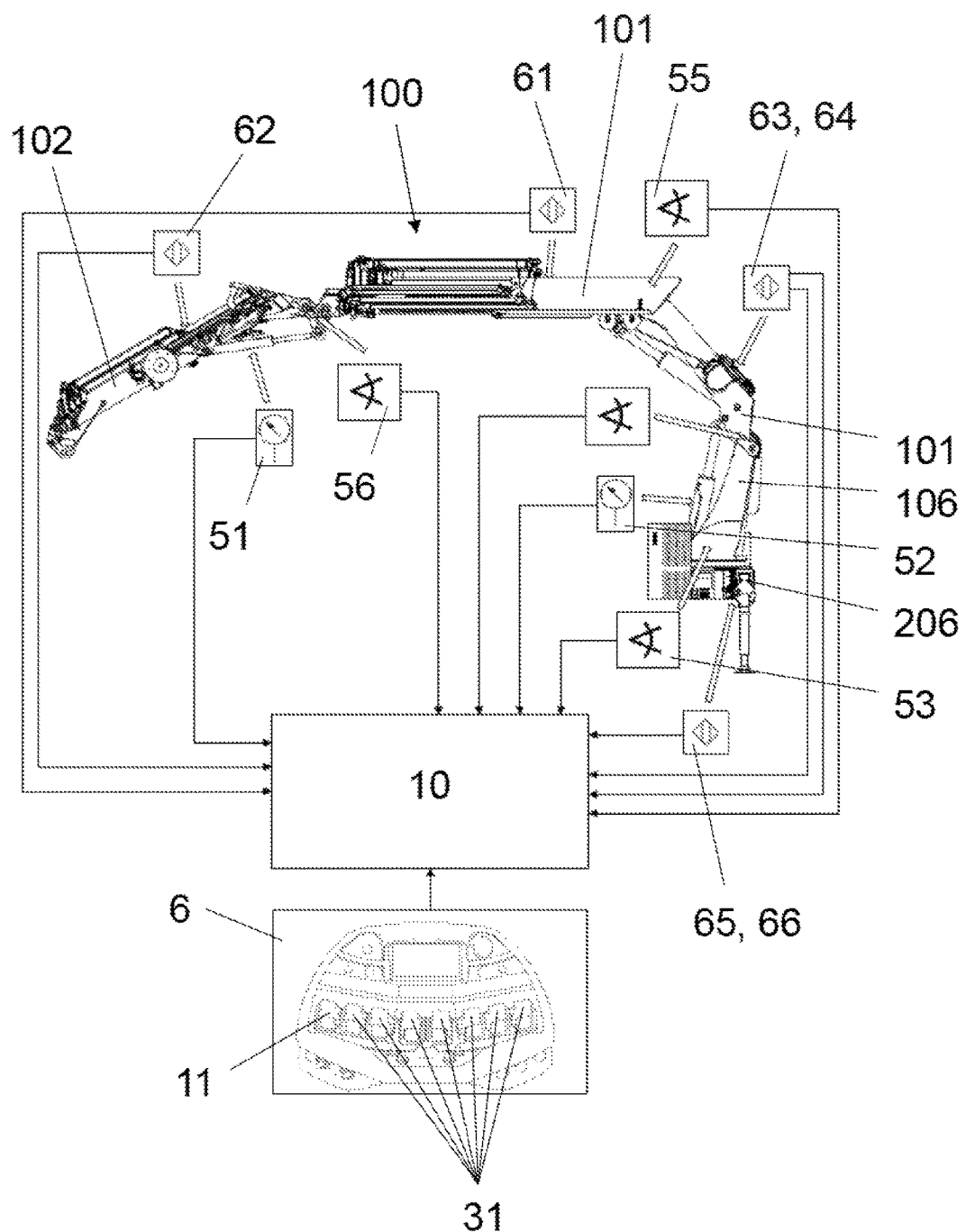

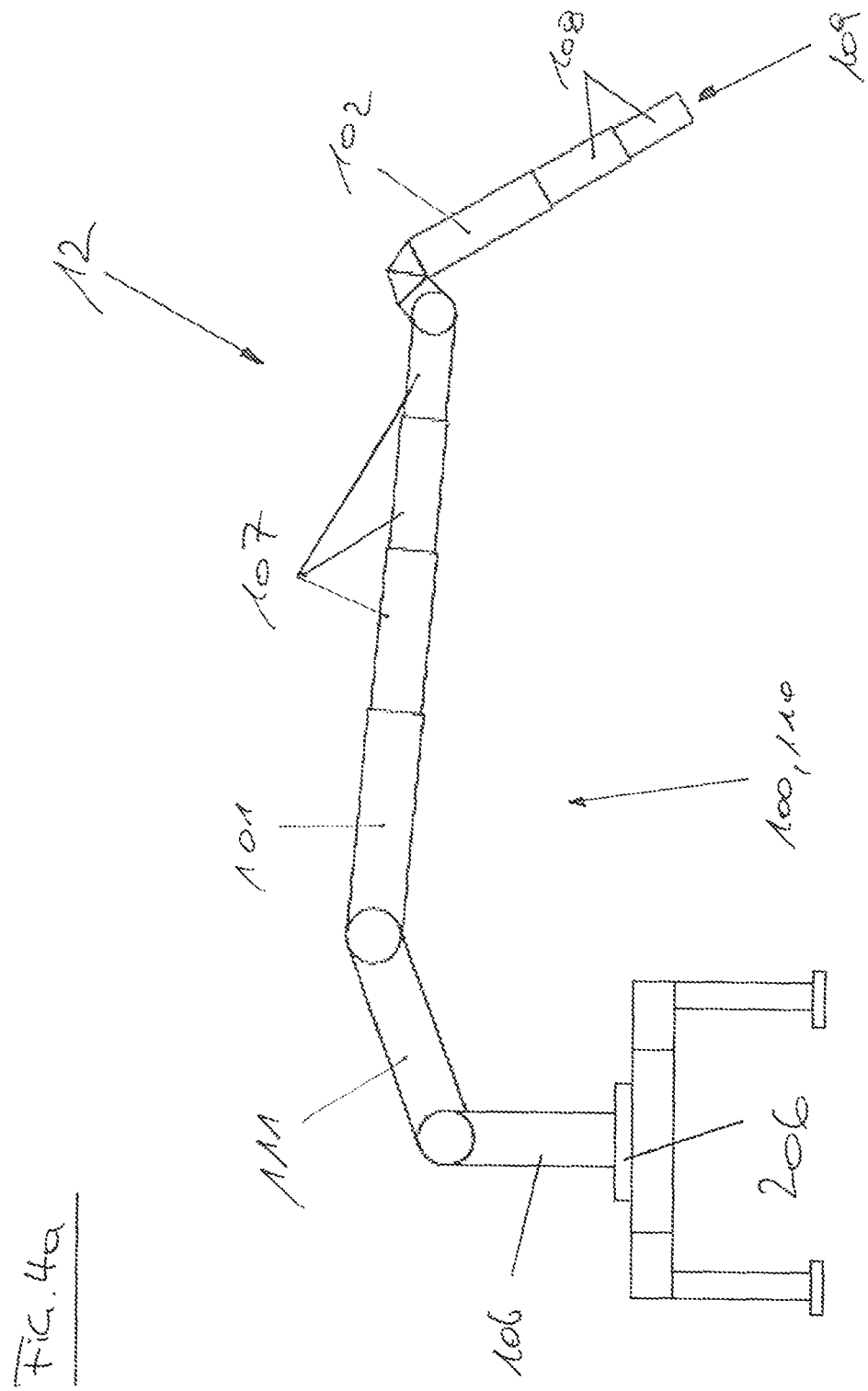

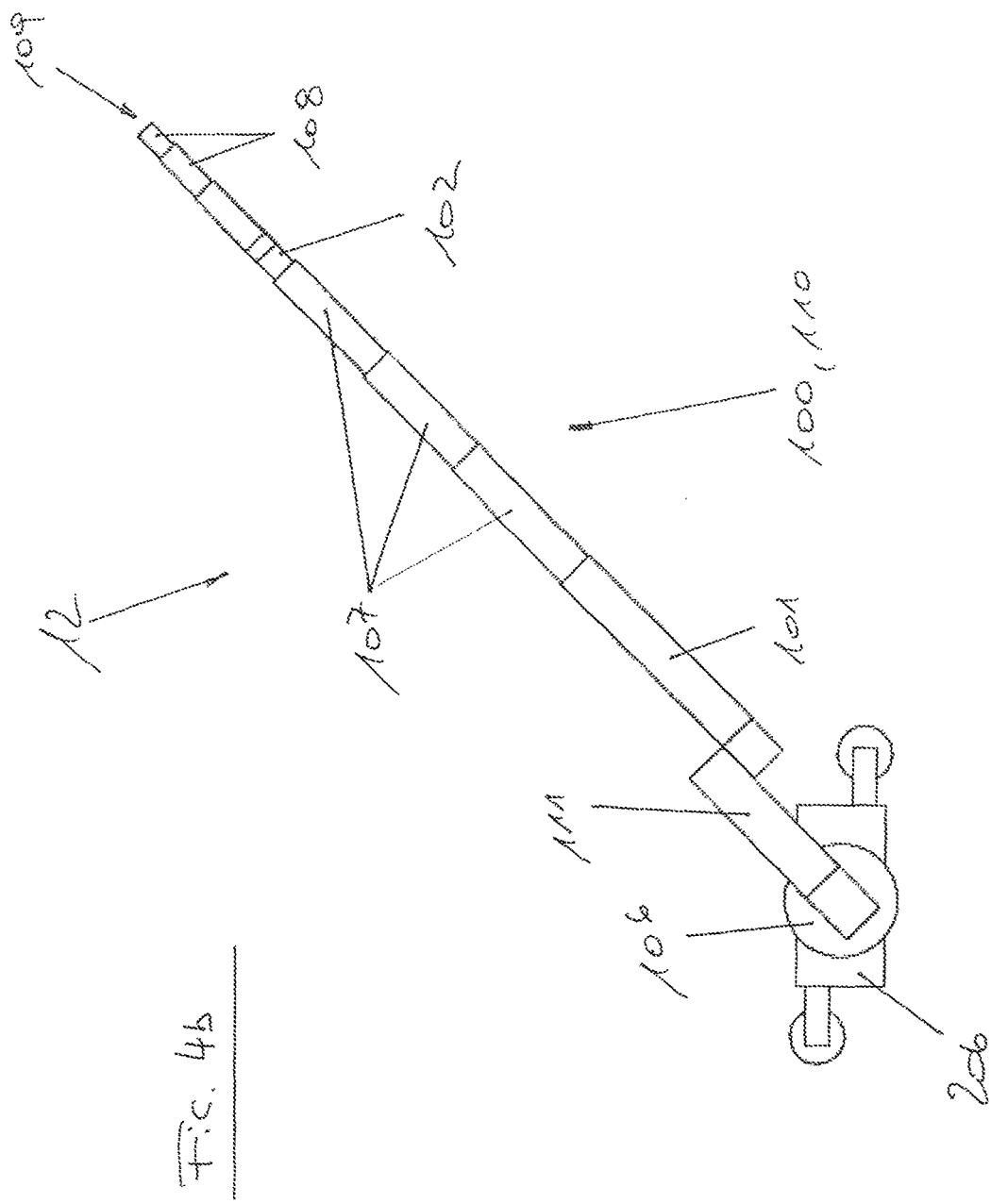

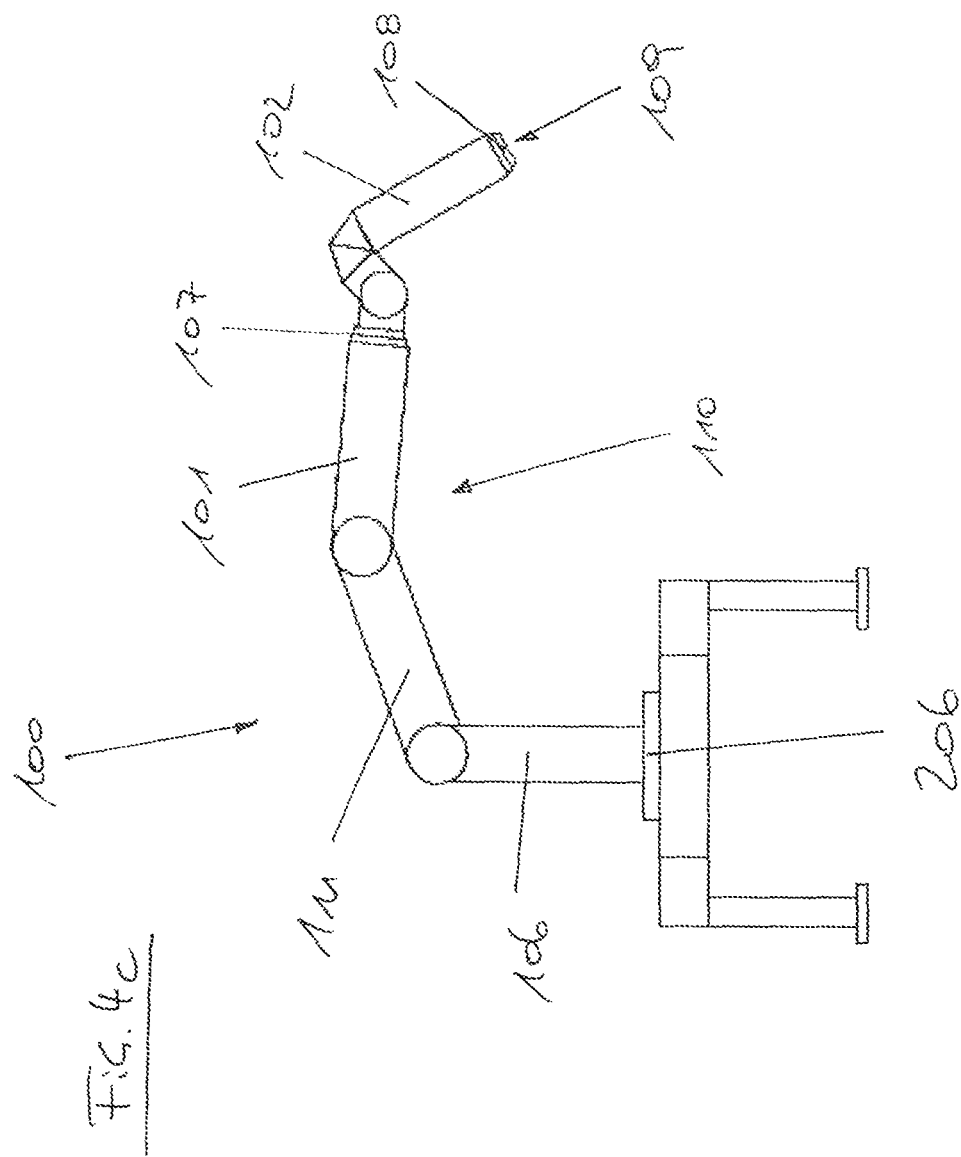

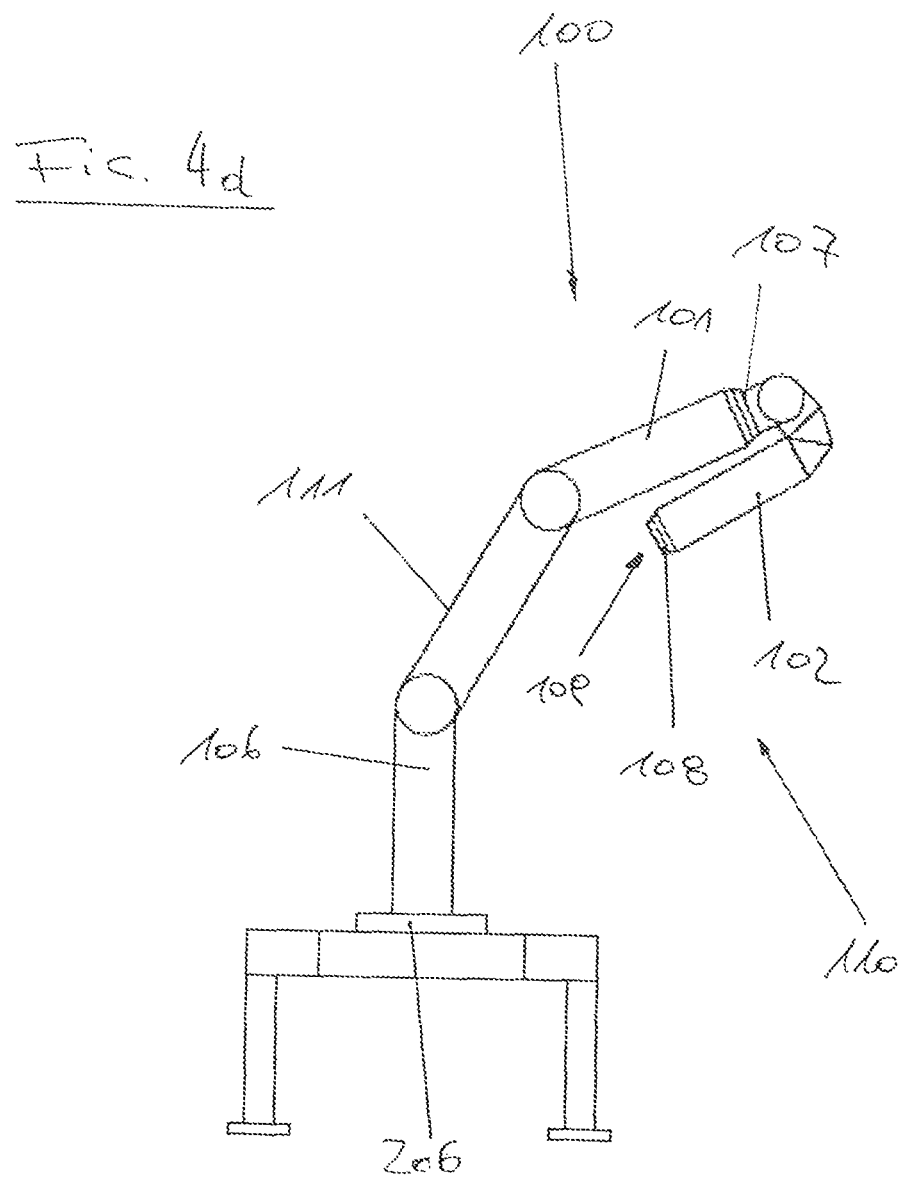

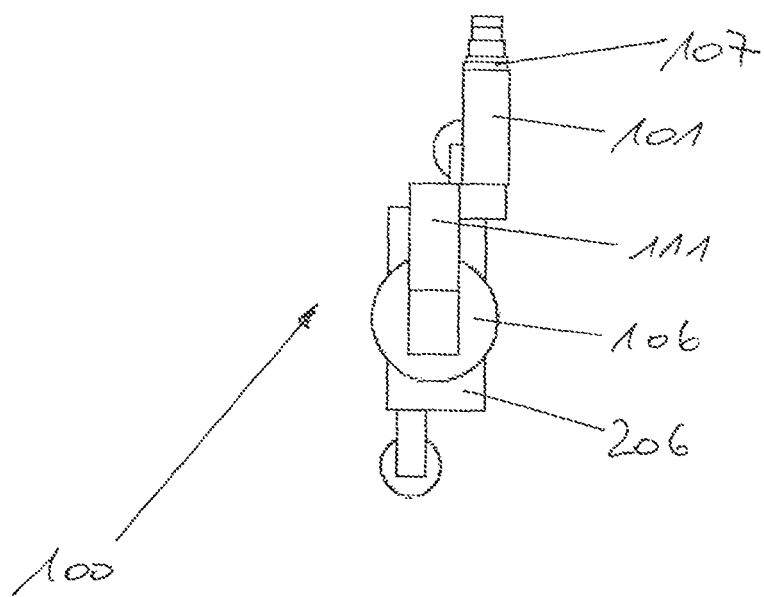

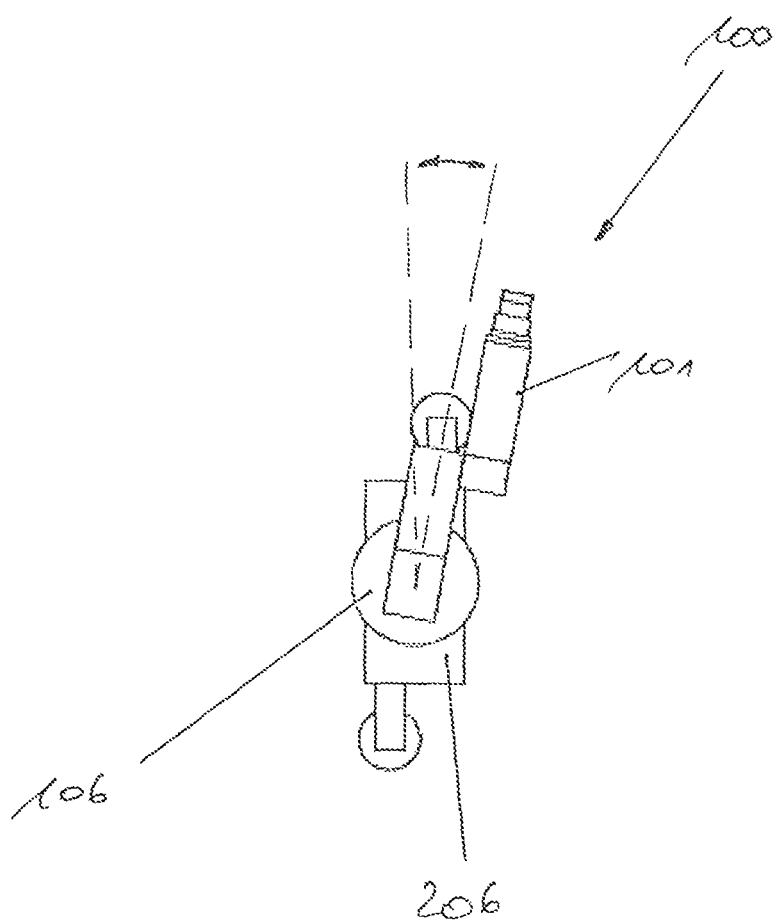

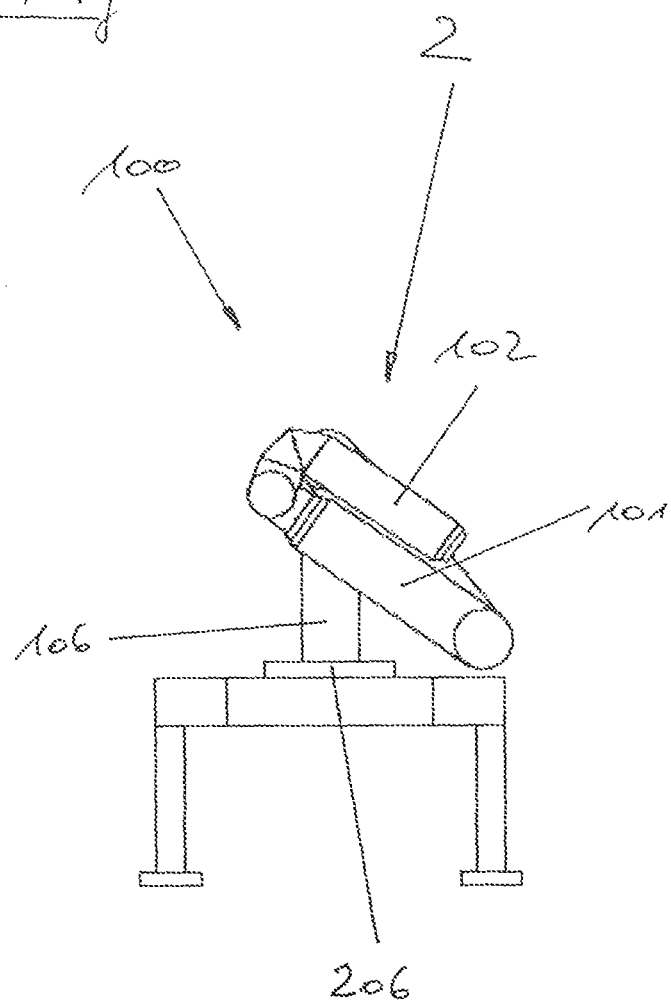

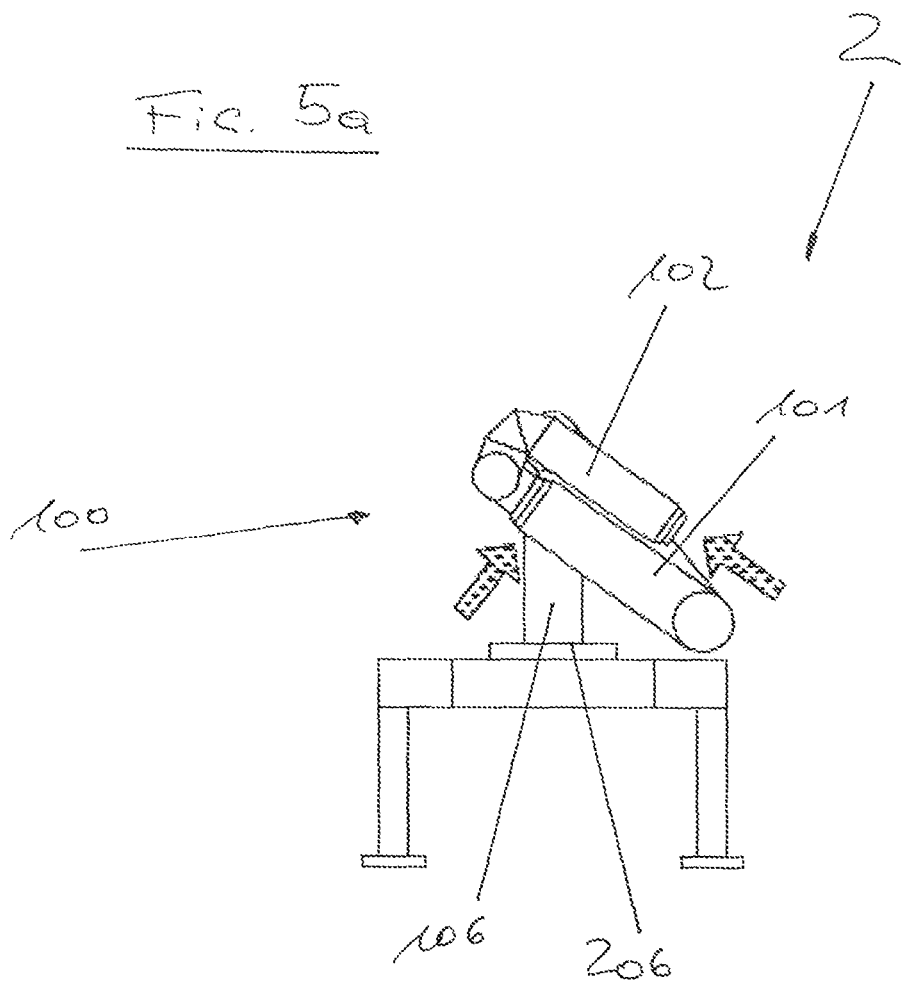

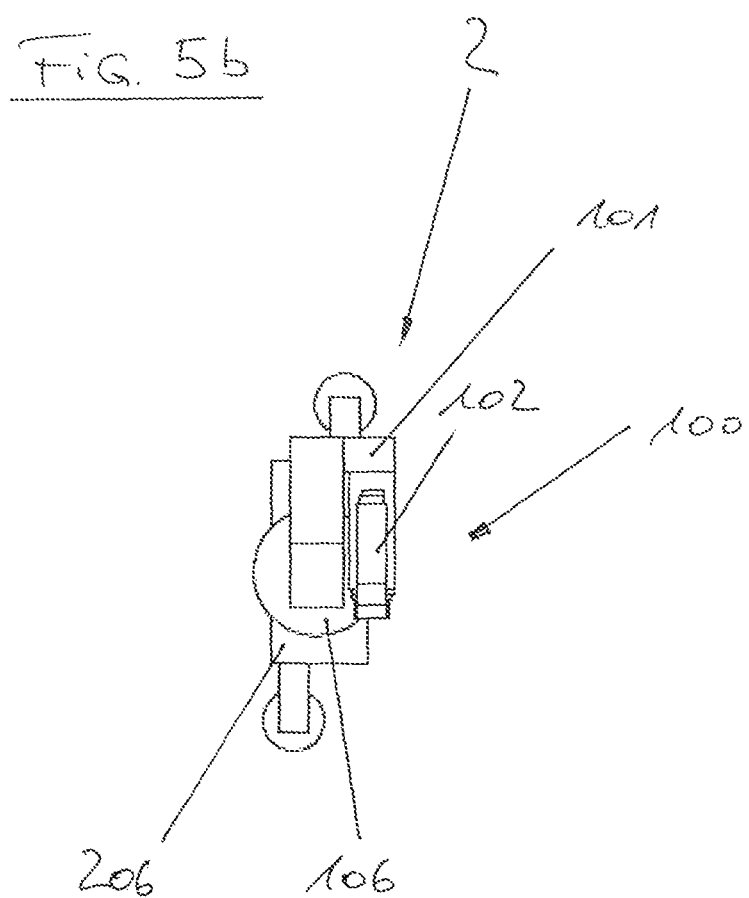

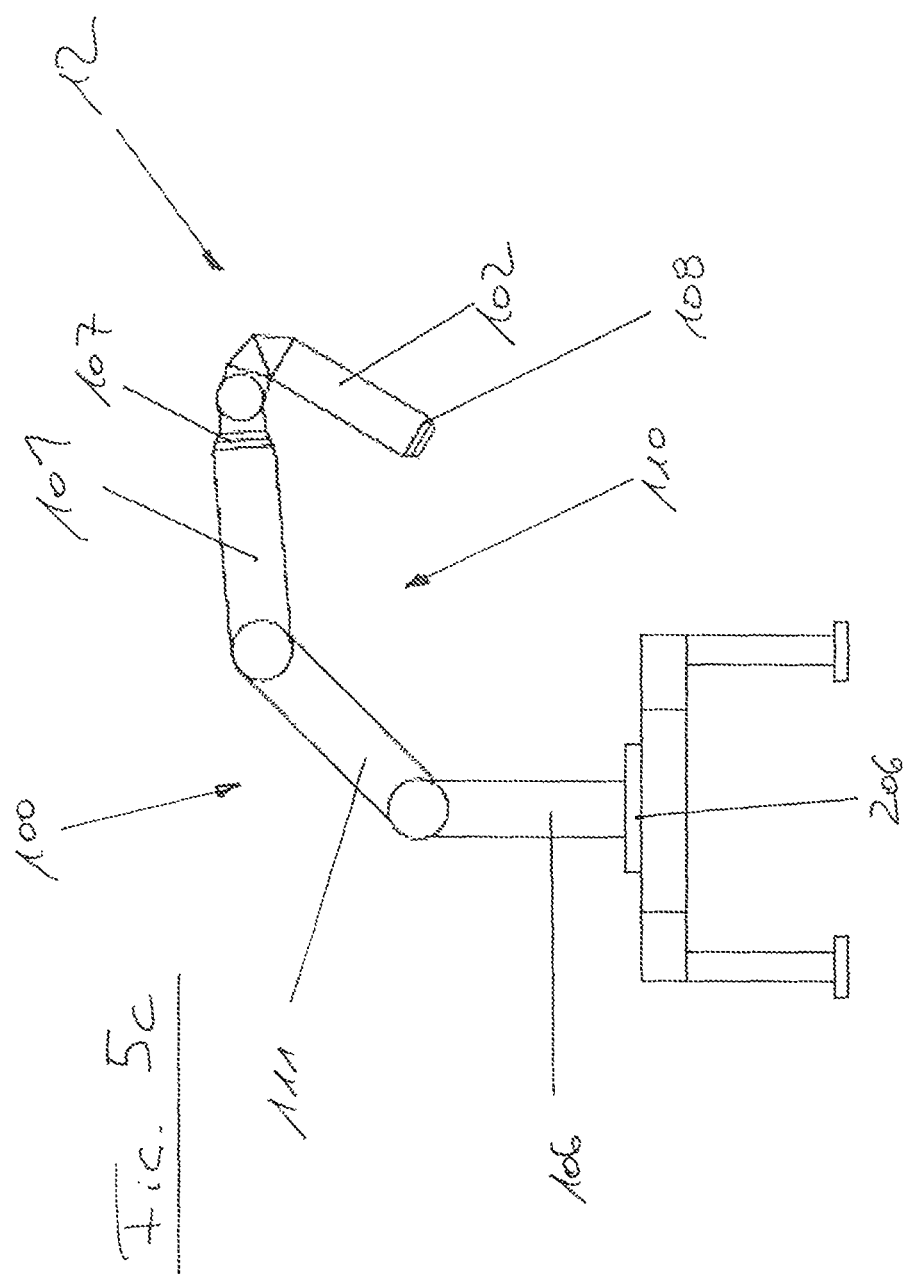

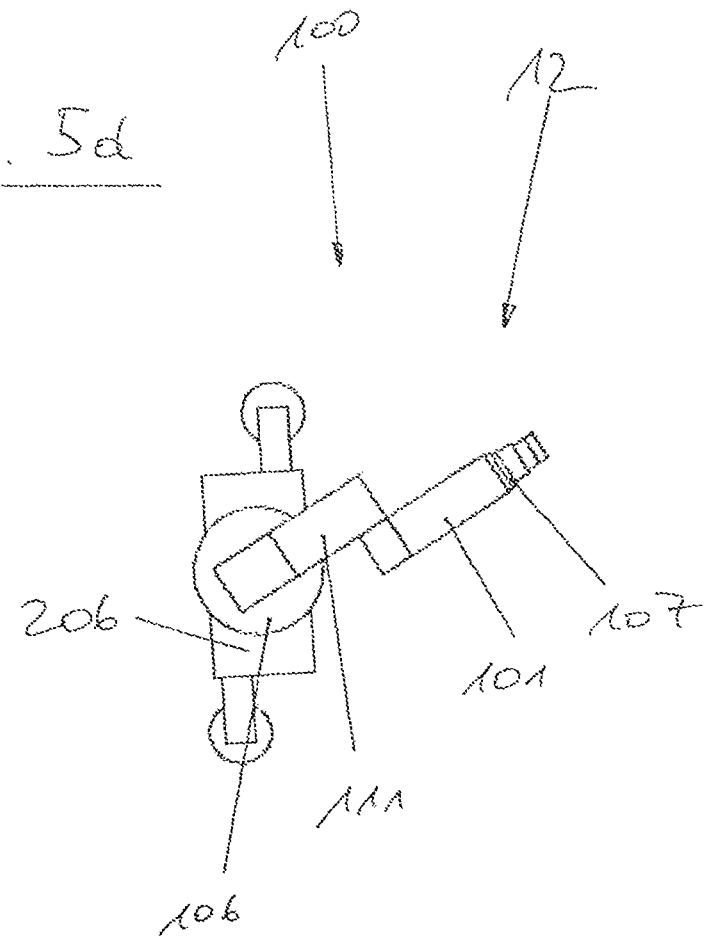

CRANE CONTROLLER

BACKGROUND OF THE INVENTION

The present invention concerns a crane controller, a crane, in particular a cargo crane, having such a crane controller, and a vehicle having a crane of that kind.

All cranes have an operating mode in which the crane geometry (that is to say, the relative position of the crane arms with respect to each other in a plane or relative to a crane column) and the pivotal position of the crane arms together with the crane column relative to a crane base can be freely selected by a user. The user can alter the relative position of the crane arms and pivot the crane arms together with the crane column relative to the crane base, for example, by actuation of operating elements. In the background, the operation of the crane is monitored by safety devices which intervene upon actuation of operating elements by the user, which lead to a safety-critical state. For example, the stability of the crane can be monitored.

Cranes of the general kind set forth are also already known, in which the crane controller has a first operating mode in which the crane can be freely operated by a user by control commands and a second operating mode which can be activated by the user and in which the crane geometry is variable in a predetermined sequence of movements by the crane controller. The second operating mode serves to bring the crane in predetermined fashion from a parking position into a working position, or to bring the crane in a predetermined manner from a possibly predetermined working position into the parking position.

Those cranes of the general kind set forth have a dead man's switch as an operating element, which is to be constantly pressed to activate the second operating mode and to maintain the second operating mode.

SUMMARY OF THE INVENTION

The object of the present invention is to provide a crane controller of the general kind set forth, a crane having such a crane controller, and a vehicle having such a crane, which permits more comfortable operation which assists the user by virtue of a predetermined sequence of movements for moving into the parking and the working position respectively.

The aims set forth as objects of the invention are achieved in that the crane controller has a menu-driven user interface, in which the menu-driven user interface has a function which can be selected by the operator by which the crane controller switches from the first into the second operating mode.

Preferably, the crane controller in the predetermined sequence of movements of the crane geometry also takes account of a second pivotal arm (fly jib) and correspondingly actuates and positions the second pivotal arm to reach the parking position or working position, respectively.

Preferably, when a second pivotal arm is provided (fly jib or other detectable crane configurations), the crane controller automatically actuates different intermediate positions and also different working positions in a predetermined sequence of movements of the crane geometry. Thus, the predetermined sequence of movements of the crane geometry describes a crane configuration-dependent trajectory.

Also, by a display of lever assignment, corresponding activation and deactivation of the operating elements by the crane controller, there is a reduction in the risk of unwanted operating errors by the user, which enhances safety.

In a particularly preferred embodiment, at any desired moment in time while the crane controller is in the second operating mode, the crane controller pauses the succession of changes in the crane geometry by actuation of a switch (for example a dead man's switch on the control console) and all operating elements acquire their original function assignment. In that case, the user can manually perform a correction where applicable to the crane geometry (for example, to pass around an obstacle). After conclusion of actuation of the switch, all operating elements are blocked again automatically by the crane controller and only the speed presetting is possible in order to be able to continue the interrupted sequence after renewed and positive safety checking by the crane controller.

Preferably, in the predetermined sequence of movements of the crane geometry, the crane controller always moves to a parking position of the crane from a predetermined direction of rotation of a crane column of the crane relative to a crane base of the crane. It is thus possible to ensure that, to compensate for any measurement tolerances, the crane column is always moved from the same rotary direction and in addition from the same angular region into the parking position.

BRIEF DESCRIPTION OF THE DRAWINGS

Further advantages and details of the invention and various embodiments are discussed with reference to the accompanying Figures in which:

FIG. 2 shows a perspective view of a vehicle with crane arranged thereon, FIG. 3 shows a control console for operation of a crane controller according to the invention and diagrammatically the crane controller with the crane sensor system, FIGS. 4a through 4g diagrammatically show a sequence of changes to the crane geometry caused by a crane controller according to the invention which is in the second operating mode, starting from a working position and ending in a parking position, and FIGS. 5a through 5d diagrammatically show a sequence of changes to the crane geometry caused by a crane controller according to the invention which is in the second operating mode, starting from a parking position and ending in a working position.

DETAILED DESCRIPTION OF THE INVENTION

Figure 1A:
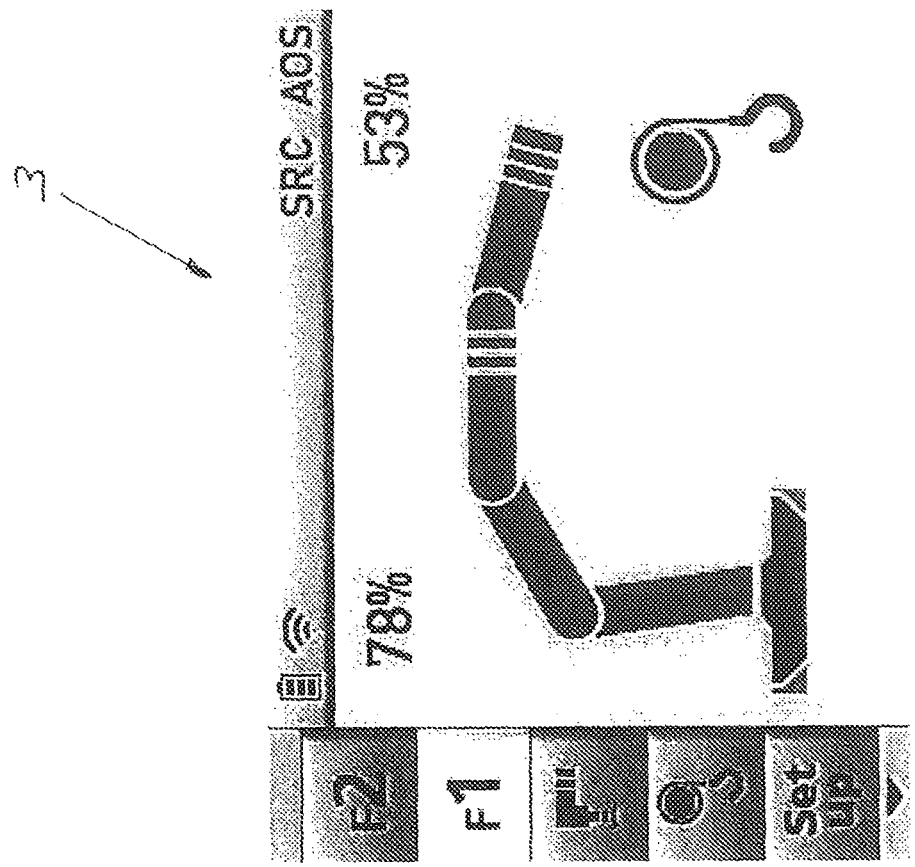
FIG. 1a shows the main menu of a menu-driven user interface of a crane controller according to the invention.

FIG. 1a shows the main menu of the menu-driven user interface of the crane controller. The main menu has selectable sub-menu points, and in this preferred embodiment a menu bar arranged at the left-hand edge of the main menu. Access is given to the sub-menu "activation of the second operating mode" (FIG. 1b) by selecting the appropriate icon.

Figure 1B:
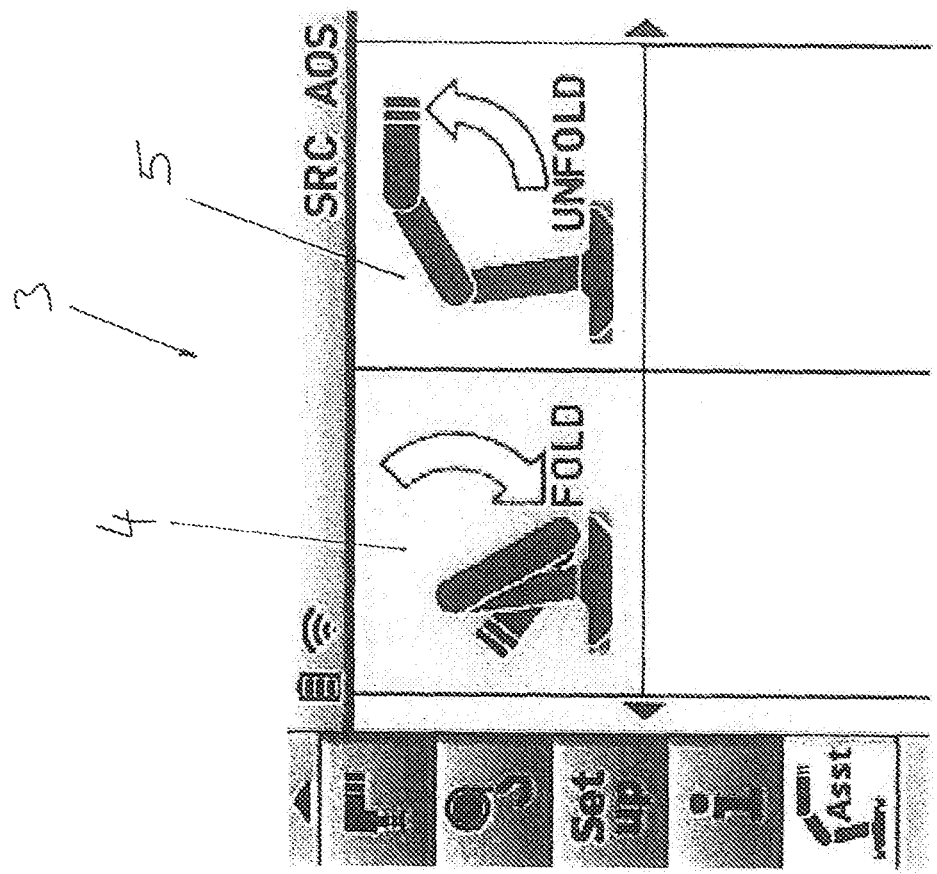
FIG. 1b shows a sub-menu of the main menu of FIG. 1a, FIG. 1c shows a safety query of the menu-driven user interface.

FIG. 1b shows the two selection options for activation of the second operating mode, namely "parking position" and "working position". Selection of the option "parking position", after a positively implemented check in respect of the safety situation, in particular the currently prevailing crane geometry and the equipment state of the crane, by the crane controller and the user, causes a sequence of changes to the crane geometry, starting from a "working position" and ending in a "parking position". Selection of the option "working position", after a positively implemented check in respect of the safety situation, in particular the currently prevailing crane geometry and the equipment state of the crane, by the crane controller and the user, causes a sequence of changes to the crane geometry, starting from a "parking position" and ending in a "working position".

Figure 1C:
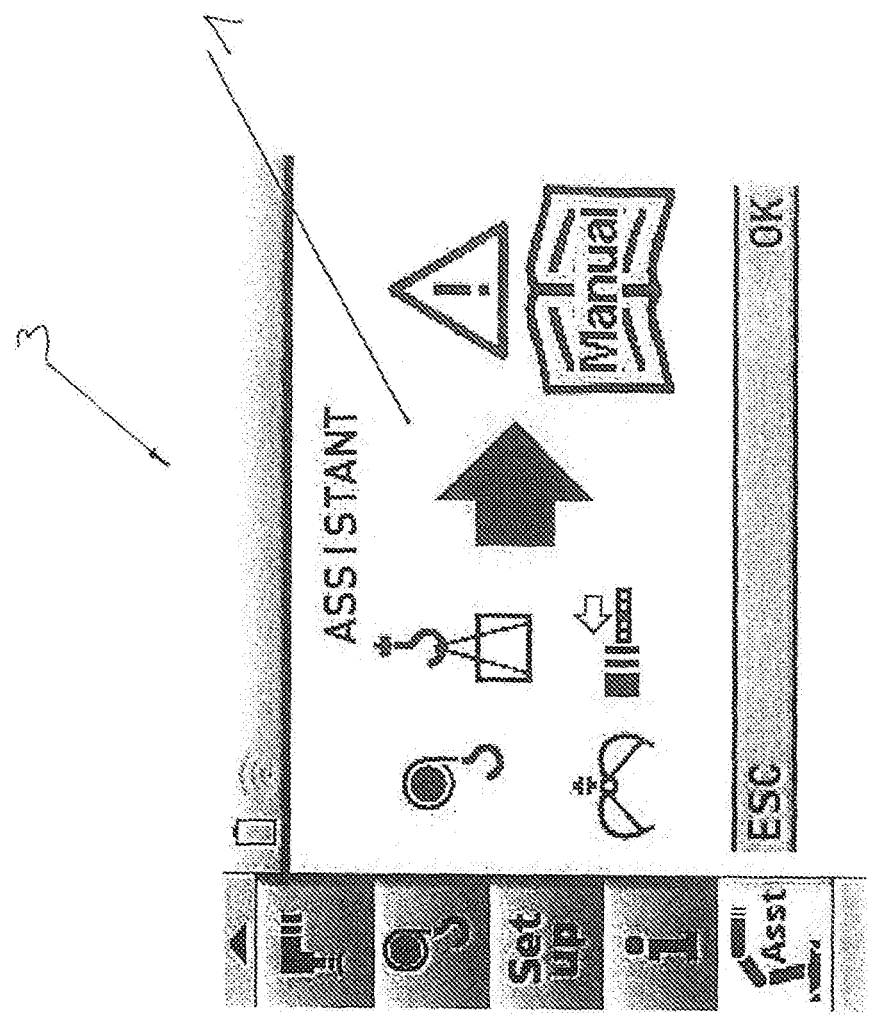
FIG. 1d shows a further configuration of a sub-menu of the main menu of FIG. 1a, FIG. 1e shows a further configuration of a safety query of the menu-driven user interface.
FIG. 1f shows a further configuration of a sub-menu of the main menu of FIG. 1a, FIG. 1g shows a further configuration of a safety query of the menu-driven user interface.
Figure 16:
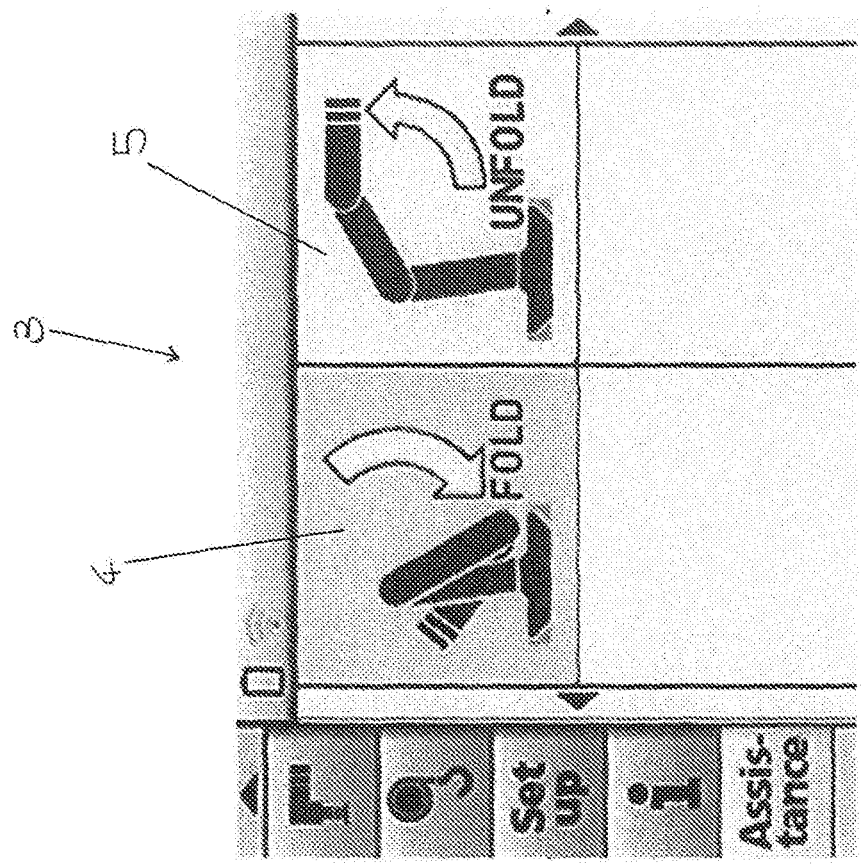
Figure 12:
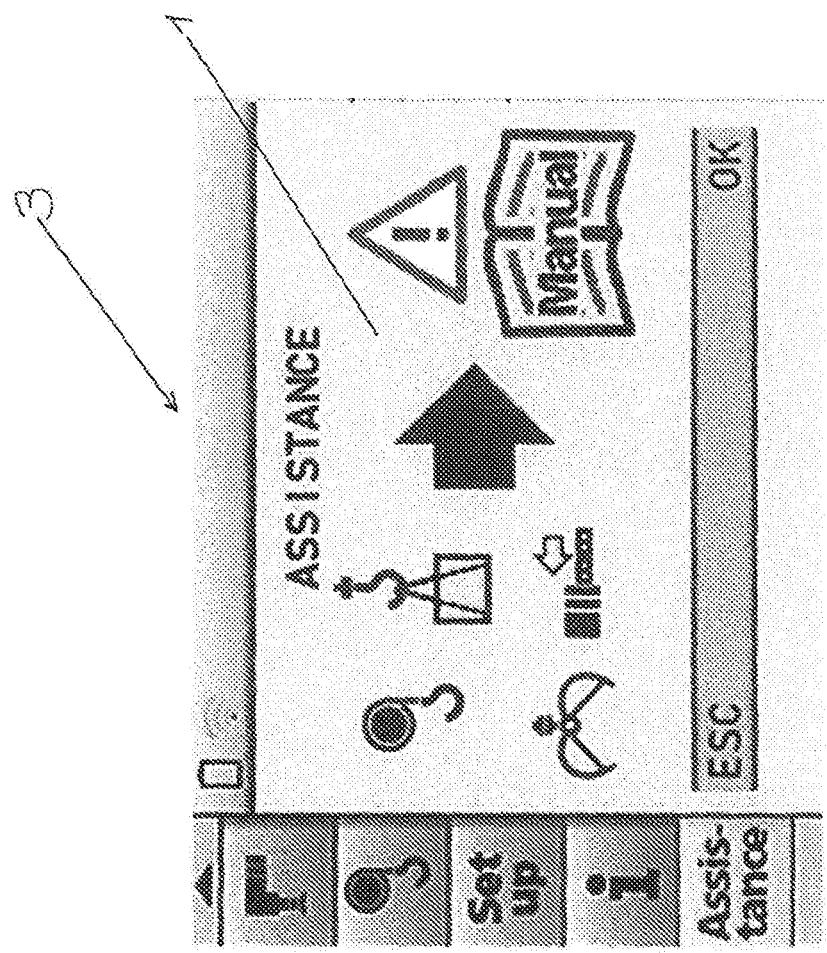

FIG. 1c shows a safety query of the menu-driven user interface which in this embodiment appears at the transition from the translatory to the rotatory movement phase of the change in the crane geometry. Linked thereto, the change in crane geometry is paused. The crane controller in that case remains in the second operating mode and waits for confirmation by the user. The aim and purpose of the safety query in this embodiment is to cause the user to perform a visual check of the safety situation. That can include for example:

checking the equipment state of the crane in regard to ancillary equipment or loads which cannot be automatically detected by the crane controller. For example, if a load mounting means where applicable is already dismounted, determining whether there is still a load on the crane.

checking the equipment state of the guide means of the load cable and its cable winch, checking the crane for completely retracted thrust systems and manual jib extensions (of the crane and a fly jib where applicable), and checking the spatial aspects. Determining whether there is sufficient space for performing the sequence of changes in crane geometry into the "parking position" and "working position" respectively.

After confirmation by the user, the crane controller continues processing of the remaining sequence of changes in the crane geometry to reach the desired end position. As long as no confirmation has been implemented by the user, the crane controller remains in the second operating mode but does not cause any movements. If actuation by the user fails to occur within a predetermined period of time, the function is broken off and the crane controller terminates the second operating mode. Confirmation by the user is necessary again in this preferred embodiment to change into the first operating mode.

FIG. 1d shows a further configuration of a sub-menu with the two selection options for activation of the second operating mode, which again include "parking position" and "working position".

FIG. 1e shows a further possible option in regard to the configuration of a safety query of the menu-driven user interface.

Figure 1F:
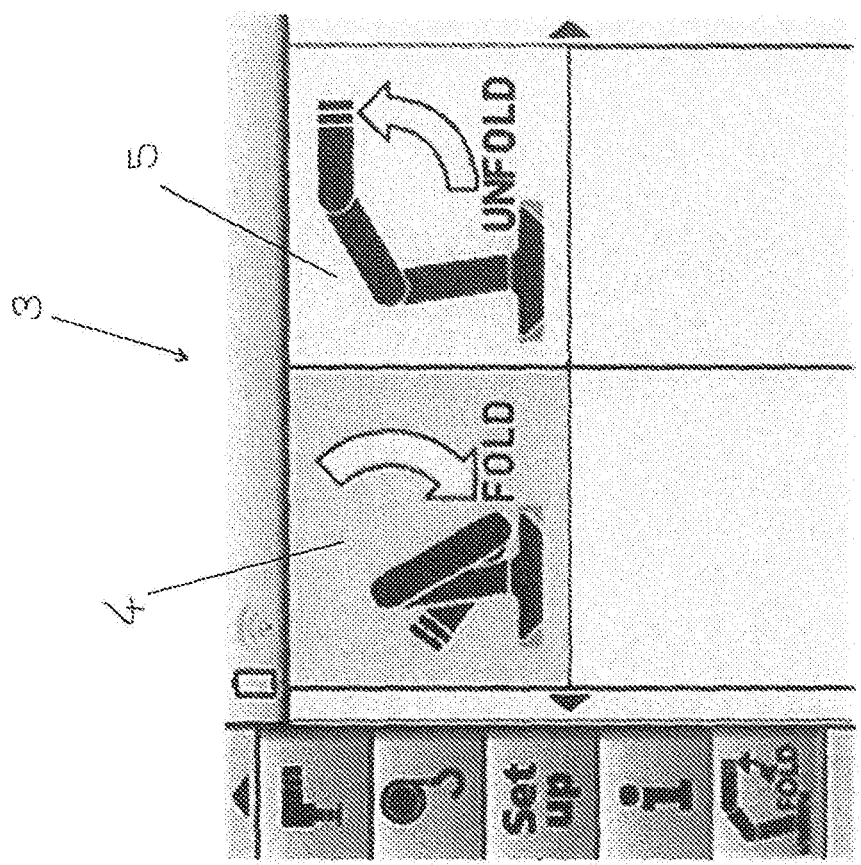
Figure 19:
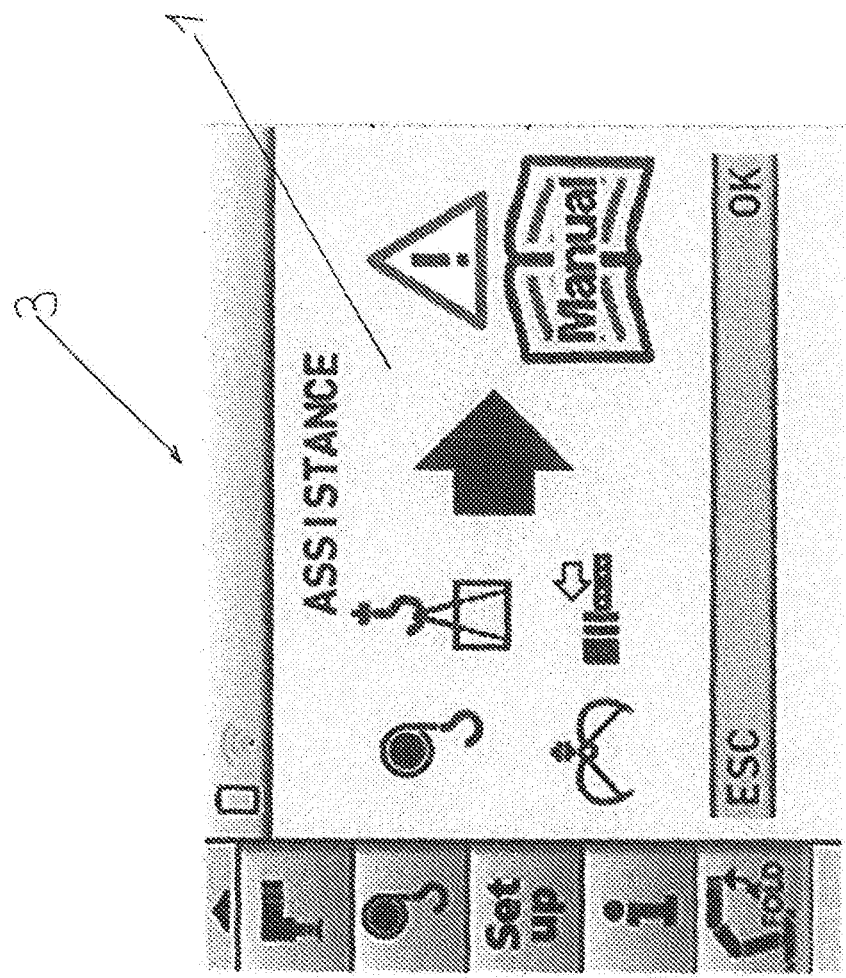

FIG. 1f shows a further possible configuration of a sub-menu with the two selection options for activation of the second operating mode which again include "parking position" and "working position".

FIG. 1g shows a further configuration of a safety query of the menu-driven user interface.

FIG. 2 shows a side view of a vehicle 50 on which a vehicle crane 100 is arranged. The crane system 110 of the vehicle crane 100 in this case has the lift arm 111 and the pivotal arm 101. In this preferred embodiment, the cable winch 104 is arranged on the lift arm 111. That cable winch 104 serves for lifting loads by the load cable 103.

Provided on the pivotal arm 101—which has a telescopic configuration—is a hingedly arranged second pivotal arm which here is in the form of a fly jib 102. In this case, the pivotal arm 101 has a plurality of boom extensions 107, and the fly jib 102 also has a plurality of boom extensions 108. The end of the crane system 110 forms the crane tip 109. It is to be noted here that this embodiment involves a variant of a crane system 110 of the vehicle crane 100, and naturally it is also possible to envisage any other configuration of a crane system 110, like for example a crane system 110 with a telescopic lift arm.

FIG. 3 shows a control console 6 for the operation of a crane controller 10 according to the invention, and diagrammatically shows the crane controller 10. Here, the control console 6 preferably has a radio remote controller. Depending on the selection of one of the two options "parking position" 4 and "working position" 5 by the user, the crane controller 10 automatically checks whether, insofar as can be detected by the crane controller 10, there are safety obstacles in regard to activation of the second operating mode.

For example, the crane controller 10 checks whether the present crane geometry is suitable in safety terms at all as the starting point for the predetermined sequence of changes to the crane geometry into the "parking position" 4 or "working position" 5, respectively. If the crane 100 is in a working position, a check is made for example to ascertain whether the angle between the outermost arm of the crane and the crane column 106 is in a given range. It is also possible to check whether the pivotal angle of the crane column 106 relative to the crane base 206 is within an acceptable range. In addition, the crane controller 10 can check whether there is a working cage on the crane 100. The generally known sensor system of a crane 100 of the general kind set forth can be used for all those functions.

Hitherto, all operating levers 11, 31 are available to the user for free operation in accordance with the function assignment allocated at the factory.

If all operating levers 11, 31 are in the neutral position and the user has given his approval, then all operating levers 31 except one are blocked. The non-blocked operating lever 11 after activation of the second operating mode serves for the user to be able to select the speed at which the crane geometry is changed, by deflection of the operating lever 11 out of its neutral position.

The remaining Figures now show how specifically in the embodiment by way of example the predetermined sequence of change in the crane geometry takes place.

FIG. 4a diagrammatically shows the crane 100 in a working position 12 with extended thrust systems 107 and 108 of the pivotal arm 101 and the fly jib 102, respectively. It is not possible to see in FIG. 4a (but see FIG. 2) that there is also a cable winch 104 in the working position with the cable 103 reeved thereon.

FIG. 4b shows a view from above of the crane 100 in the working position 12 shown in FIG. 4a in order to show the pivotal state of the crane column 106 relative to the crane base 206.

FIG. 4c shows, after activation of the second operating mode, that crane geometry which occurs after retraction of the crane system 110 and the fly jib 102. The translatory changes in the crane geometry are thus concluded. Hitherto, there have not yet been any rotatory changes in the crane geometry (change in the pivotal state of the crane column 106 with respect to the crane base 206, or a change in the relative angles between the crane arms 101, 102 and 111.).

In this embodiment the safety query 1 of the crane controller 10 is now presented to the user, as shown in FIG. 1c.

It is assumed hereinafter that the safety query 1 was positive.

A change in the relative angles between the crane arms is now effected without altering the pivotal state of the crane column with respect to the crane base (FIG. 4d). In that defined intermediate position of the crane, a plausibility check in respect of the crane loading is effected by the pressure sensor 52. Loading, which depending on the crane configuration can be detected by the crane controller (for example: whether a fly jib is or is not fitted), must be below predetermined limit values.

FIG. 4e shows the crane geometry after the change has been made in the pivotal angle of the crane column relative to the crane base. In the transition from FIG. 4b to FIG. 4e, the cable winch is also pivoted into the parking position.

FIG. 4g shows the change in the relative angles between the crane arms 101, 102, 111 into the parking position 2. Shortly before the parking position 2 is reached, the system preferably implements a switch-over from position regulation by the sensors 54 and 56 to pressure regulation by the pressure sensors 51 and 52 in order to work around a possible play in the crane arms 102, 111 or inaccuracy in position regulation. Shut-down is effected when a predetermined pressure level is reached.

There is naturally also a given play in regard to the change in the angle between the crane column 106 and the crane base 206, for which reason it is preferable that a pivotal movement of the crane column 106 relative to the crane base 206 is always effected from the same angle range (FIG. 4f), that is to say if the crane column 106 should approach the parking position 2 from another angle range, then it goes beyond that position so that it can be moved into the parking position from the specified same angle range (see FIG. 4f).

Similarly to FIGS. 4a-4g, FIGS. 5a-5d show the predetermined transition from the parking position 2 into the working position 12.

During the predetermined sequence of movements of the crane geometry, the change in length caused thereby in respect of the reeved load cable 103 of the cable winch 104 is automatically compensated for by the cable tension being regulated by the crane controller 10. That, therefore, prevents the cable from becoming slack and also prevents an overload situation in respect of the cable winch 104.

Further, the crane controller 10 performs automatic hydraulic biasing of the different thrust systems 107 and 108 and also of the lifting cylinders for the pivotal movement of the crane arms 101 and 102.

At any desired point in time while the crane controller 10 is in the second operating mode, a switch (dead man's switch) can be actuated, which has the result that the crane controller 10 pauses in the sequence of changes in the crane geometry and releases all operating levers 11, 31. In that case, the user can manually perform a correction where applicable in the crane geometry (for example to pass around an obstacle). After manual correction and release of the dead man's switch by the user, the crane controller 10 begins again with the safety check in respect of the crane geometry prevailing at that time and possibly resumes the interrupted sequence.

Further, the crane controller 10 also automatically turns down the speed of displacement or pivotal movement of the crane geometry. That is relevant specifically when the crane 100 for example approaches the limit range in terms of stability, end abutments, or electronically adjustable blocking ranges.

Advantageously, beside the currently prevailing crane geometry, the crane controller 10 also detects the support state and can thus assess or establish whether the crane 100 is stable.

Both individual intermediate positions during the predetermined sequence of movements for reaching the parking or working position and also the working position itself are dependent on the crane configuration which can be detected by the crane controller 10. That is to be interpreted as meaning that the crane controller 10 accesses various parameter sets in equipment-specific relationship, in particular for the target values in terms of position regulation for the sensor 54 through 56.

The above description in regard to the succession of sequences in the changes in the crane geometry relates to a particularly preferred embodiment by way of example. In addition, however, the sequence itself can be altered and additional preferred parking and working positions can be established.

Thus, preferably sequences which are to be pre-defined by the user can be input into the crane controller 10, in that respect the idea is that for example service workshops can perform that. For safety reasons, in that case the workshops or the user can select or alter those sequences only from a predetermined range of values or also only chronological orders of the sequence of movements can be influenced.

The invention claimed is:

1. A crane controller for a crane, comprising:
a menu-driven user interface, the menu-driven user interface having a function to be selected by a user so as to switch the crane controller from a first operating mode into a second operating mode;
wherein, in the first operating mode, the crane is freely operable by the user by control commands, and in the second operating mode activated by the user, the crane geometry is changeable in a predetermined sequence of movements by the crane controller; and
wherein the second operating mode selectively (i) moves the crane in a predetermined manner from a parking position into a working position, and (ii) moves the crane in a predetermined manner from a predetermined working position into the parking position.

2. The crane controller as set forth in claim 1, wherein the crane controller outputs a safety query to be confirmed by the user at a predetermined point in the predetermined sequence of movements.

3. The crane controller as set forth in claim 2, wherein the predetermined point in the predetermined sequence of movements is at a transition from a translatory to a rotatory movement phase of the change in crane geometry.

4. A crane controller for a crane, comprising:
a menu-driven user interface, the menu-driven user interface having a function to be selected by the user so as to switch the crane controller from a first operating mode into a second operating mode;
wherein, in the first operating mode, the crane is freely operable by a user by control commands and, in the second operating mode activated by the user, the crane geometry is changeable in a predetermined sequence of movements by the crane controller;
wherein the crane controller outputs a safety query to be confirmed by the user at a predetermined point in the predetermined sequence of movements; and wherein at the predetermined point the crane controller pauses the predetermined sequence of movements of the crane geometry.

5. The crane controller as set forth in claim 4, wherein, after a safety query confirmed by the user, the crane controller continues the predetermined sequence of movements of the crane geometry.

6. The crane controller as set forth in claim 1, wherein, in the second operating mode, the crane controller activates an operating lever of a control console, and by actuation of the operating lever, the crane geometry can be altered by the crane controller in the predetermined sequence of movements.

7. The crane controller as set forth in claim 6, wherein the crane controller controls a speed with the predetermined sequence of movements of the crane geometry based on a deflection of the operating lever of the control console.

8. The crane controller as set forth in claim 6, wherein, in the second operating mode, other operating levers are deactivated by the crane controller.

9. The crane controller as set forth in claim 6, further comprising a switch configured such that, in the second operating mode, actuation of the switch causes the crane controller to pause the sequence of changes in the crane geometry and operating elements of the control console including the operating lever and other deactivated operating levers to regain an original function assignment.

10. The crane controller as set forth in claim 9, wherein after termination of the actuation of the switch, the crane controller cancels the pause of the sequence of changes to the crane geometry and activates the operating lever of the control console and deactivates the other operating levers.

11. A crane controller for a crane, comprising:
a menu-driven user interface, the menu-driven user interface having a function to be selected by a user so as to switch the crane controller from a first operating mode into a second operating mode;
wherein, in the first operating mode, the crane is freely operable by the user by control commands and, in the second operating mode activated by the user, the crane geometry is changeable in a predetermined sequence of movements by the crane controller; and
wherein, in the predetermined sequence of movements of the crane geometry, the crane controller monitors the stability of the crane or a vehicle on which the crane is disposed.

12. The crane controller as set forth in claim 1, wherein the crane controller involves a crane tip in the crane geometry.

13. The crane controller as set forth in claim 2, wherein the safety query to be confirmed by the user is aimed at accessory devices disposed on the crane and/or a safety-critical spatial pivotal state of the crane and/or correct equipment state of the crane.

14. The crane controller as set forth in claim 1, wherein, during the predetermined sequence of movements of the crane geometry, the crane controller pivots and positions a second pivotal arm.

15. The crane controller as set forth in claim 1, wherein during the predetermined sequence of movements of the crane geometry, the crane controller regulates a tension of a load cable.

16. The crane controller as set forth in claim 1, wherein during the predetermined sequence of movements of the crane geometry, the crane controller pivots a cable winch of a load cable.

17. The crane controller as set forth in claim 1, further comprising at least one pressure sensor, the crane controller being configured to ascertain a crane loading by the at least one pressure sensor and to compare the crane loading on a crane configuration to predetermined limit values, and when at least one of the predetermined limit values is exceeded, to block a change in the crane geometry.

18. The crane controller as set forth in claim 1, wherein depending on the crane configuration, the crane controller automatically implements different intermediate positions and different working positions in the predetermined sequence of movements of the crane geometry so that the predetermined sequence of movements of the crane geometry describes a crane configuration-dependent predefined trajectory.

19. The crane controller as set forth in claim 1, wherein the crane controller performs automatic hydraulic biasing of at least one thrust system and of lifting cylinders for pivotal movement of the crane arms.

20. The crane controller as set forth in claim 1, further comprising sensors, the crane controller being configured to regulate a position of the crane geometry based on the sensors, wherein before attainment of a given position of the crane, the crane controller effects switching over from position regulation to pressure regulation depending on a pressure sensor and displaces the crane into the given position by the pressure regulation.

21. The crane controller as set forth in claim 1, wherein in the predetermined sequence of movements of the crane geometry, the crane controller always moves to a parking position of the crane from a predetermined direction of rotation of a crane column of the crane relative to a crane base of the crane.

22. The crane controller as set forth in claim 1, wherein the crane controller automatically changes the crane geometry in the predetermined sequence of movements.

23. A crane comprising the crane controller as set forth in claim 1.

24. A vehicle comprising the crane as set forth in claim 23.

25. The crane controller as set forth in claim 9, wherein the switch is a dead man's switch.

26. The crane controller as set forth in claim 13, wherein the correct equipment state of the crane includes a state of a cable winch and a guide of a load cable.

27. The crane controller as set forth in claim 14, wherein the second pivotal arm is a fly jib.

28. The crane controller as set forth in claim 20, wherein the given position of the crane is the parking position.

29. The crane as set forth in claim 23, wherein the crane is a cargo crane.

* * * * *